United States Patent
Grantz et al.

(10) Patent No.: US 7,241,051 B2
(45) Date of Patent: Jul. 10, 2007

(54) RADIAL CAPILLARY SEAL FOR FLUID DYNAMIC BEARING MOTORS

(75) Inventors: Alan L. Grantz, Aptos, CA (US); Raquib U. Khan, Pleasanton, CA (US); Norbert Steven Parsoneault, Scotts Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/151,878

(22) Filed: Jun. 13, 2005

(65) Prior Publication Data

US 2005/0286820 A1    Dec. 29, 2005

Related U.S. Application Data

(62) Division of application No. 10/263,609, filed on Oct. 2, 2002, now abandoned.

(60) Provisional application No. 60/370,718, filed on Apr. 5, 2002.

(51) Int. Cl.
*F16C 17/10* (2006.01)

(52) U.S. Cl. ...................... 384/119; 384/107

(58) Field of Classification Search ............. 384/107, 384/111–115, 118, 120, 132, 119
See application file for complete search history.

(56) References Cited

U.S. PATENT DOCUMENTS 6,126,320 A * 10/2000 Ichiyama ............ 384/112
6,828,709 B2 12/2004 Grantz et al.
6,939,046 B2 * 9/2005 Oelsch ............ 384/100
2003/0190100 A1 10/2003 Grantz et al.
2004/0028301 A1 * 2/2004 Kull et al. ............ 384/107
2005/0286820 A1 12/2005 Grantz et al.
2006/0023982 A1 2/2006 Uenosono et al.

FOREIGN PATENT DOCUMENTS

JP    10-196646    * 7/1998

* cited by examiner

*Primary Examiner*—William C. Joyce
(74) *Attorney, Agent, or Firm*—Darby & Darby

(57) ABSTRACT

A seal with a primary axis lying in the radial direction so that the fluid bearing is primarily extending in the axial direction between the rotating shaft and surrounding sleeve is disclosed. The capillary seal is positioned with an opening adjacent an end of the fluid bearing gap, and comprises two walls which diverge as they extend radially away from the fluid bearing so that the fluid held in the radial capillary seal is maintained adjacent an end of the gap, while the size of the reservoir defined by the diverging walls provides a large reservoir volume. The seal uses an additional capillary defined by a narrow annulus between the rotating shaft and a seal wall end. The narrow annulus establishes very high shock resistance preventing fluid loss past the outer axial wall of the radially capillary seal, and defines a small surface area from which evaporation can occur.

13 Claims, 6 Drawing Sheets

RADIAL CAPILLARY SEAL FOR FLUID DYNAMIC BEARING MOTORS

CROSS REFERENCE TO A RELATED APPLICATION

This application claims priority from U.S. provisional application Ser. No. 60/370,718, filed on Apr. 5, 2002 and incorporated herein by reference. This is a divisional of application Ser. No. 10/263,609 filed on Oct. 2, 2002 now abandoned.

FIELD OF THE INVENTION

The present invention relates to fluid dynamic bearing seals and more particularly to a low profile seal design for use with such a bearing.

BACKGROUND OF THE INVENTION

Disc drive memory systems have been used in computers for many years for storage of digital information. Information is recorded on concentric tracks of a magnetic disc medium, the actual information being stored in the forward magnetic transitions within the medium. The discs themselves are rotatably mounted on a spindle, while the information is accessed by read/write heads generally located on a pivoting arm which moves radially over the surface of the rotating disc. The read/write heads or transducers must be accurately aligned with the storage tracks on the disk to ensure proper reading and writing of information.

During operation, the discs are rotated at very high speeds within an enclosed housing using an electric motor generally located inside the hub or below the discs. Such known spindle motors typically have had a spindle mounted by two ball bearing systems to a motor shaft disposed in the center of the hub. The bearings are spaced apart, with one located near the top of the spindle and the other spaced a distance away. These bearings allow support of the spindle or hub about the shaft, and allow for a stable rotational relative movement between the shaft and the spindle or hub while maintaining accurate alignment of the spindle and shaft. The bearings themselves are normally lubricated by highly refined grease or oil.

The conventional ball bearing system described above is prone to several shortcomings. First is the problem of vibration generated by the balls rolling on the bearing raceways. This is one of the conditions that generally guarantee physical contact between raceways and balls, in spite of the lubrication provided by the bearing oil or grease. Hence, bearing balls running on the generally even and smooth, but microscopically uneven and rough raceways, transmit the rough surface structure as well as their imperfections in sphericity in the vibration of the rotating disc. This vibration results in misalignment between the data tracks and the read/write transducer. This source of vibration limits the data track density and the overall performance of the disc drive system. Vibration results in misalignment between the data tracks and the read/write transducer. Vibration limits therefore the data track density and the overall performance of the disc drive system.

Further, mechanical bearings are not always scalable to smaller dimensions. This is a significant drawback, since the tendency in the disc drive industry has been to continually shrink the physical dimensions of the disc drive unit.

As an alternative to conventional ball bearing spindle systems, much effort has been focused on developing a fluid dynamic bearing. In these types of systems lubricating fluid, either gas or liquid, functions as the actual bearing surface between a stationary shaft supported from the base of the housing, and the rotating spindle or hub. Liquid lubricants comprising oil, more complex fluids, or other lubricants have been utilized in such fluid dynamic bearings. The reason for the popularity of the use of such fluids is the elimination of the vibrations caused by mechanical contact in a ball bearing system, and the ability to scale the fluid dynamic bearing to smaller and smaller sizes.

It is important to the long term life and reliable operation of a fluid dynamic bearing that the fluid level be maintained over a long term. However, the fluid may in many instances be jarred out of the bearing gap by shock or vibrations; further, variations in operating an environmentals temperatures may cause some evaporation of the fluid over the long term.

Most current designs of fluid dynamic bearing motors employ a capillary seal at least at one end of the bearing to maintain the fluid in the bearing. This seal which is typically established by having one of the two walls of the fluid dynamic bearing gap diverge from the other, thereby establishing a miniscus across the end of the fluid column in the gap, the seal utilizes capillary attractive force to retain the oil or other fluid within the gap; maintaining the fluid during non-operating shock and vibration events.

Because the gap progressively widens before terminating in the miniscus within the capillary seal, the capillary seal can also serve as an oil reservoir to provide for oil lost due to evaporation. However, the two functions, providing a seal and providing a reservoir are somewhat conflicting. A large reservoir requires a wide capillary seal gap; but the wider the gap, the lower the oil retention capability. As the height of a fluid dynamic bearing motor is reduced in order to use such motors in smaller profile disc drives, less space is available for the capillary seal. Therefore, it is desirable to make the seal as short as possible so as to maximize the height available for the bearings to support the relative rotation of the shaft and the sleeve. As the capillary seal becomes shorter, its volume decreases, reducing the oil available to make up for that lost due to evaporation or shock. A desirable seal would have a relatively large reservoir volume, and high shock resistance. If the oil volume were sufficiently large, lower viscosity (implying a higher evaporation rate) oil could be used, lowering the power loss due to viscous friction. If properly chosen, the lower viscosity oil would have a flatter viscosity versus temperature curve, resulting in a more efficient fluid bearing over the temperature range. Therefore, a large volume, higher shock resistant fluid reservoir which uses minimal axial space is a highly desirable design objective.

SUMMARY OF THE INVENTION

The present invention is intended to provide a fluid dynamic bearing assembly incorporating a capillary seal which is especially useful in a low profile high speed assembly.

More particularly, the present invention is to provide a capillary seal which uses minimum axial space so that the length of the bearing can be optimized.

In a further advantage, the present invention provides a capillary seal which has high shock resistance.

In yet another feature of the invention, the design provides a capillary seal which also provides an oil reservoir larger than that which can be achieved with a conventional capillary seal so that the fluid in the fluid dynamic bearing gap is maintained.

These and other features, advantages and objectives of the invention are achieved by providing a seal whose primary axis lies in the radial direction where the fluid bearing is primarily extending in the axial direction between the rotating shaft and surrounding sleeve. The capillary seal is positioned with an opening adjacent an end of the fluid bearing gap, and comprises two diverging walls, with the narrowest gap between the two generally radially extending walls being closely adjacent an end of the fluid gap. The walls diverge as they extend radially away from the fluid bearing. In this way, the fluid held in the radial capillary seal is maintained adjacent an end of the gap, while the size of the reservoir provided or defined by the diverging walls provides a relatively large reservoir volume.

In a preferred embodiment, the seal uses an additional capillary which is defined by a narrow annulus between the rotating shaft and a radially inward end of one of the two walls of the seal adjacent the narrow end of the radial capillary seal. This very narrow gap provides a narrow annulus which establishes very high shock resistance to the loss of fluid past the outer axial wall of the radially capillary seal, as well as defining a small surface area from which evaporation can occur. This substantially reduces evaporation of fluid from the bearing.

In an alternative embodiment, grooves may be defined on one of the two facing surfaces of this secondary capillary seal or narrow annulus, with the grooves being defined to pump toward the fluid bearing gap so that the ability to withstand loss of fluid from the fluid bearing gap is further enhanced.

In a further embodiment, at least one fill hole is defined in the axially outer wall of the fluid bearing reservoir which serves as both a vent for the reservoir in order to support the establishment of the miniscus at the radially distal end of the reservoir fluid, and to allow for filling of the reservoir after assembly of the shaft and sleeve.

In yet another alternative, an optional fill reservoir volume for initial filling may be provided in the axially inner wall of the fluid reservoir. This reservoir may be an open space or may be filled with a material which has a high absorption capacity; it may be filled with fluid which may be used to both fill the reservoir and fill the gap of the fluid dynamic bearing adjacent the capillary seal/reservoir by allowing oil which has been filled into this fill reservoir to wick into the gap.

Other features include that in addition to providing both a very small opening to the outer atmosphere from which evaporation may occur, the radial capillary seal which is a large diverging capillary seal provides a reservoir incorporating a small oil fill hole which limits the surface of area available for evaporation.

It can further be seen that the design will be relatively easy to assemble, and supports an easy filling sequence of oil into the reservoir in the fluid bearing gap.

BRIEF DESCRIPTION OF THE DRAWINGS

For a fuller understanding of the present invention, reference is made to the accompanying drawings in the following detailed description wherein.

DETAILED DESCRIPTION OF THE PREFERRED EMBODIMENTS

Reference will now be made in detail to exemplary embodiments of the invention, examples of which are illustrated in the accompanying drawings. While the invention will be described in conjunction with these embodiments, it is to be understood that the described embodiments are not intended to limit the invention solely and specifically to only those embodiments, or to use solely in the disc drive which is illustrated. On the contrary, the invention is intended to cover alternatives, modifications and equivalents which may be included within the spirit and scope of the invention as defined by the attached claims. Further, both hard disc drives, in which the present invention is especially useful, and spindle motors, where the invention is also especially useful are both well known to those of skill in this field. In order to avoid confusion while enabling those skilled in the art to practice the claimed invention, this specification omits such details with respect to known items.

Figure 1:
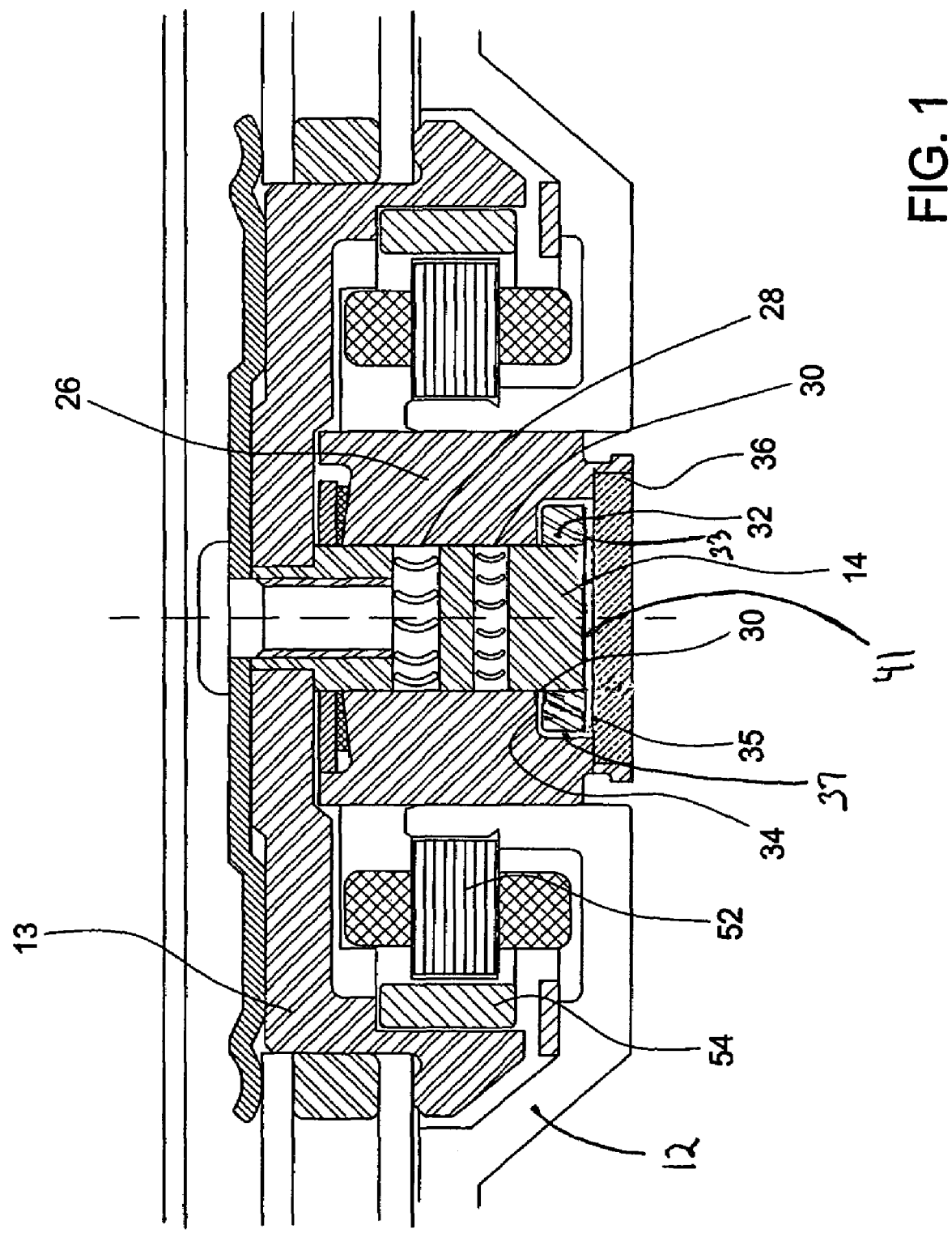
FIG. 1 is an elevation view cross-section of a computer hard disk drive assembly taken along the axis of rotation of the spindle motor.
Figure 2:
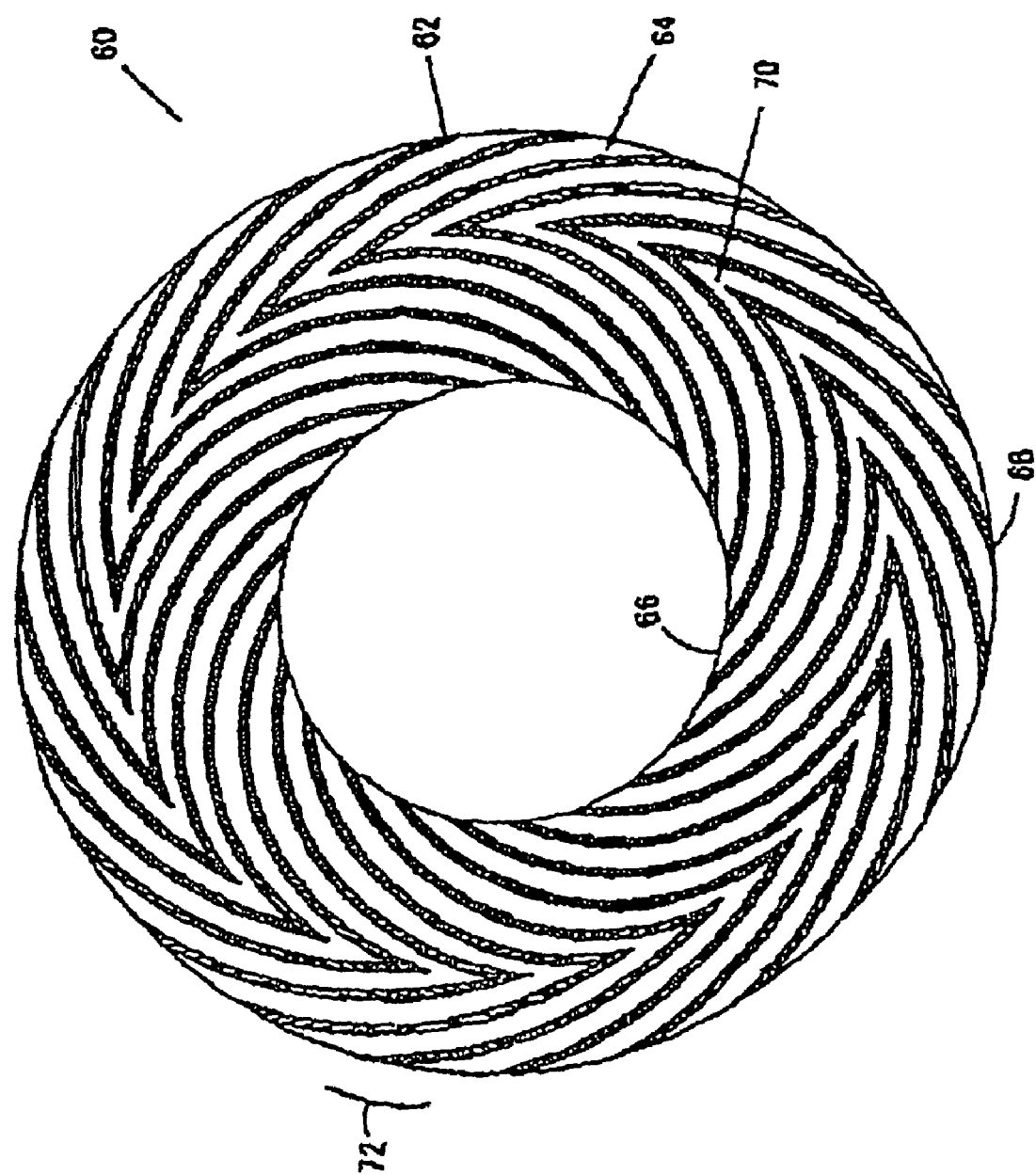
FIG. 2 is a plan view of the grooved surface of a fluid baring useful in the embodiment of FIG. 1.
Figure 4:
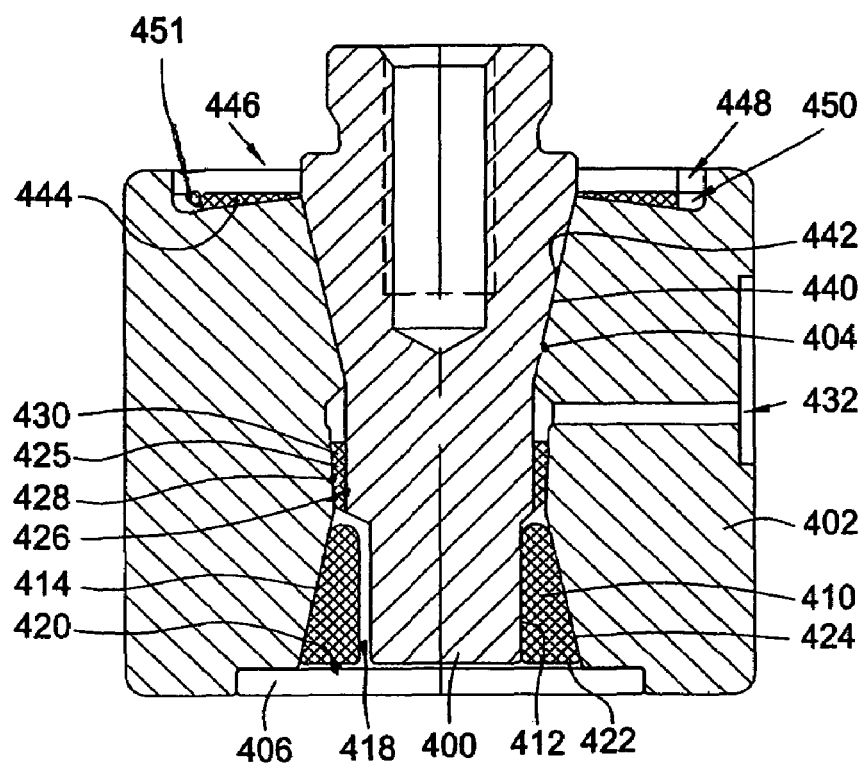
FIG. 4 is a vertical sectional view of a conical rotating shaft fluid dynamic bearing assembly incorporating the invention.
Figure 3:
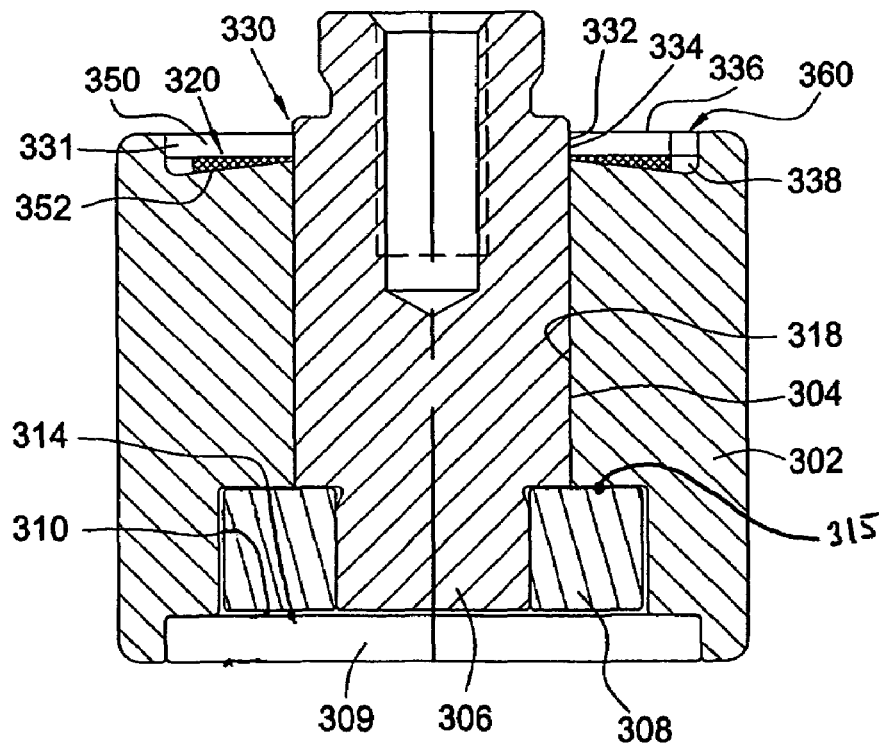
FIG. 3 is a vertical elevation view of a journal thrust plate style fluid dynamic bearing incorporating the present invention.
Figure 3A:
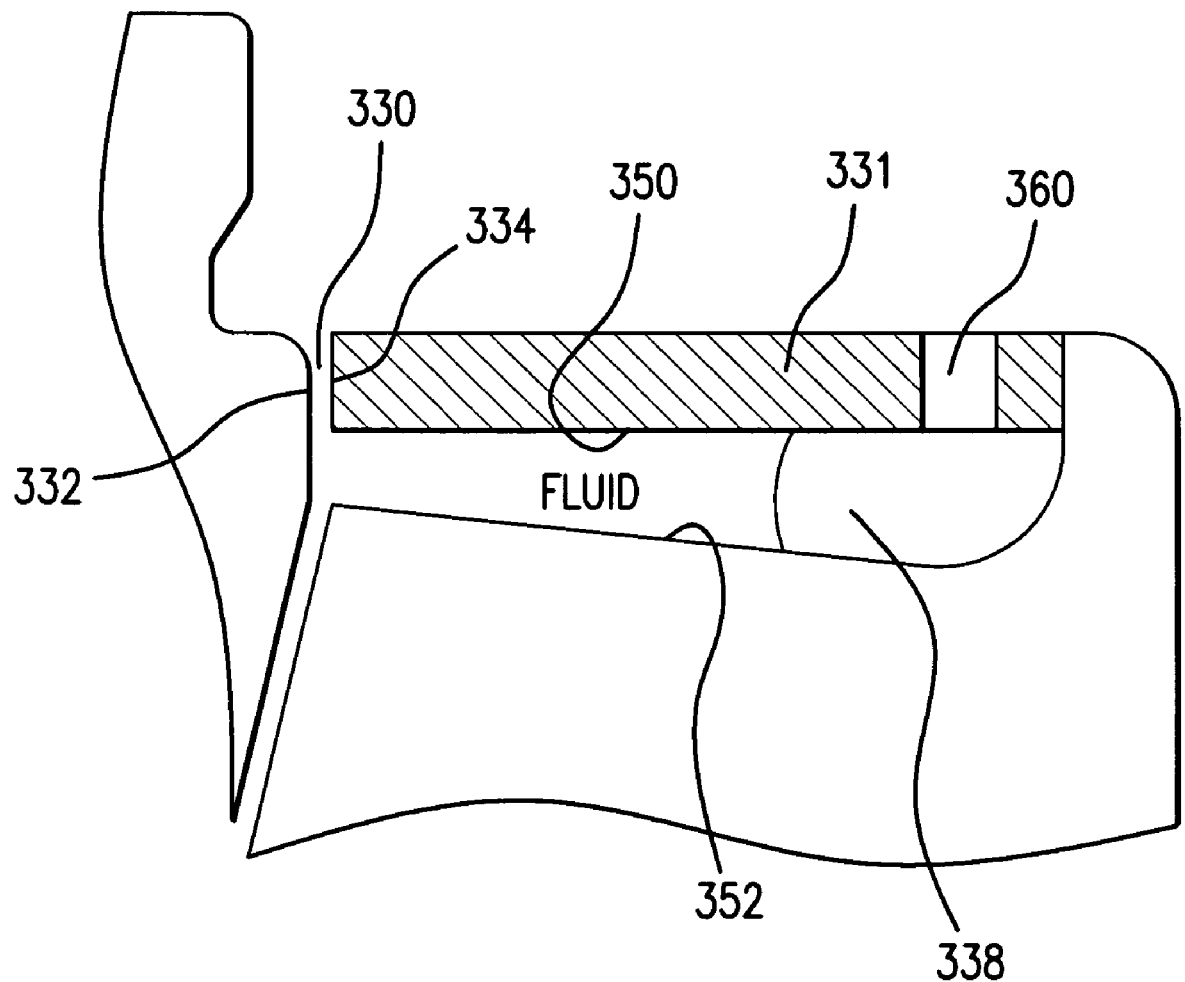
FIG. 3A is an enlarged view of a portion of FIG. 3 showing a radial capillary seal in a fluid dynamic bearing motor in accordance with one embodiment of the invention.

FIG. 1 is a cross section through one embodiment of a spindle motor assembly which may readily be adapted to incorporate a fluid dynamic bearing arrangement according to the present invention. More specifically, the spindle motor shown in FIG. 1 is of a rotating shaft motor design; FIGS. 2, 3 & 4 which are used to further illustrate the present invention are of a rotating shaft design. It will be apparent to a person of skill in the art that the present invention is useful in any rotating shaft design, apart from use in a motor in a disc drive; the seal is also useful in a fluid bearing cartridge which may be used in other embodiments. It is also useful as a shaft sealing element.

FIG. 1 illustrates a cross section through one embodiment of a spindle motor which may be adapted to incorporate a fluid dynamic arrangement according to the invention. The spindle motor assembly comprises a base 12 and a hub assembly 13. A shaft 14 is mounted to the hub 13 and rotates with it.

The outer surface of the shaft 14 and the adjacent bore of the journal sleeve 26 together form hydrodynamic journal bearings 28, 30. The dual reference numbers are used because the journal bearings are typically in two sections. The bearing gaps at the hydrodynamic journal bearings, 28, 30 are typically between 0.001 mm and 0.006 mm. The journal bearings 28, 30 each include a grooved surface. The grooved surfaces may be provided either on the outer surface of the shaft 14, or the inner bore surface of the journal sleeve 26.

A thrust plate 32 is press fitted or formed or otherwise attached to an end of the shaft 14 and extends transversely to the shaft 14. The thrust plate 32 is circular in form; the thrust plate 32 defines a first axial thrust surface 33 which, together with a facing counterplate thrust surface 35 extending transverse to the journal bearing defines a first fluid dynamic thrust bearing 34 in the gap between the two surfaces. As can be seen from FIG. 1, the counterplate thrust surface 35 at bearing 34 extends transversely to the shaft. The thrust bearing 34 is connected to the journal bore at 30 thru gap 37.

A counterplate 36 is press fitted to or otherwise supported by the journal sleeve 26 adjacent the thrust plate surface 33 which is distal from the journal bearing 28, 30. The counterplate 36 has a surface 35 which cooperates with the thrust plate surface 33 to define a gap 41 in which fluid is maintained during rotational operation of the shaft and sleeve. Therefore, the counterplate 36 is sealed to the journal sleeve 26 to prevent any loss of the fluid which appears in the gap 41 between counterplate 36 and thrust plate 32.

In use, the hub assembly 13 and shaft 14 are is rotated with respect to the base 12 by means of an electromagnetic motor. The electromagnet motor comprises a stator assembly 52 mounted to the base 12, and a magnet 54 mounted to the hub assembly 13.

As can be appreciated from FIG. 1, the hub assembly 13, is supported for rotation by the shaft 14 relative to the base 12 on hydrodynamic bearings 28, 30, and 34.

The operation of a hydrodynamic bearing can be understood by reference to FIG. 2, which illustrates a plan view of one of the surfaces of a hydrodynamic thrust bearing. The illustrated hydrodynamic bearing surface, generally indicated by the numeral 60, comprises a series of alternating grooves 62 and lands 64. Each groove 62 comprises a leg which extends outward from the inner radius 66 of the hydrodynamic bearing surface 60 and a leg which extends inward from the outer radius 68 of the hydrodynamic bearing surface 60. The two legs end in a point at an intermediate radius 70. The plurality of grooves 62 and lands 64 together form a curved herringbone pattern as illustrated in the figure.

A hydrodynamic thrust bearing is formed when the bearing surface 60 is placed adjacent to an opposed bearing surface with a film of lubricant between the two surfaces. When the bearing surface 60 is rotated in the direction 72, that is against the herringbone pattern, the grooves 62 and lands 64 tend to draw lubricant from the inner and outer radii 66 and 68 towards the points of the herringbone pattern at 70. This creates a radial pressure distribution within the lubricant which serves to keep the bearing surfaces apart under external loading.

By varying the pattern of grooves 62 and the lands 64 in a known fashion, the pressure distribution across the hydrodynamic bearing can be varied. In particular, if the pressure in the bearing lubricant is greater at the inner radius 66 than at the outer radius 68 during operation, a net flow of lubricant from the inner radius 66 to the outer radius 68 will result, and vice versa. This can be done, for example, by having the intermediate radius 70, at which the points of the herringbone pattern are located, closer to the outer radius 68. Other ways in which the pressure distribution across the hydrodynamic bearing can be varied include altering the depth or width of the grooves, the number of grooves, or the angle the grooves make with a radial axis. The significance of having a net flow of lubricant across the bearing surface is discussed below.

The grooves 62 and 64 may be formed in the hydrodynamic bearing surface by any number of means including, for example, electroforming or stamping.

Although the operation of a hydrodynamic bearing has been discussed with reference to a hydrodynamic thrust bearing, it will be appreciated that the above principles can be applied to a hydrodynamic journal bearing such as the hydrodynamic journal bearings 28 and 30 illustrated in FIG. 1. In particular, the pattern of the grooves and lands of the hydrodynamic journal bearings 28, 30 can be arranged to create a net flow of lubricant in a direction along the longitudinal axis of the shaft 14, i.e. towards or away from the counterplate 36.

It will also be appreciated that a hydrodynamic bearing is not limited to the use of a herringbone pattern of grooves 62 and lands 64. For example, a spiral or sinusoidal pattern may be used as an alternative to the herringbone pattern. The herringbone pattern is however preferred for thrust bearing arrangements as it generates a pressure distribution across the bearing surface which provides improved bearing rocking stiffness. Bearing rocking stiffness is a measure of the ability of a thrust bearing to resist rotation of the bearing surfaces relative to one another about an axis traverse to the axis of rotation of the thrust bearing.

Referring for example to FIG. 3, the design shown therein comprises in the parts pertinent to understanding this invention, a sleeve 302 defining a bore 304 in which a shaft 306 is located. The shaft 306 supports or is integrated with a thrust plate 308 at an end thereof, with the thrust plate and shaft being supported for rotation relative to the sleeve 302 by at least a thrust bearing 310 defined in a gap between an axial facing surface of the thrust plate 308 and a facing axial surface 314 of counterplate 309. A further thrust bearing may be provided in the gap 315 between thrust plate 308 and sleeve 302.

At the distal end of the shaft from the thrust plate, a radial capillary seal 320 is defined. This radial capillary seal is used to maintain fluid in the journal bearing 318 which is defined between the sleeve 302 and the shaft 306 in the bore 304. The radial capillary seal 320 in fact uses two capillary seals. The first capillary is a very narrow opening 330 between the outer surface 332 of the shaft 306 and the radially inner surface 334 of the upper wall 336 of reservoir 338. This very narrow annulus 330 establishes a capillary which provides very high shock resistance (against fluid loss) as well as a small surface area from which evaporation may occur. The thickness of the radially extending wall 331 whose end 334 forms one side of this capillary is relatively large compared to the width of the annulus 330. As a further enhancement to this first capillary seal 330, small grooves may be defined on one of the two facing surfaces 332, 334 of the seals so that the relative rotation of the two surfaces causes a pumping of the fluid back toward the journal bearing defined in the gap 304. The radial width of this gap is typically but not limited to about 0.015 to 0.03 mm; this provides a very strong capillary retentive force and high shock resistance.

The design further comprises a capillary seal and reservoir 338. This reservoir is defined between a generally axially facing surface 352 of the sleeve 302 and a facing surface 350 of a radial wall or shield 331 supported from the sleeve 302. The two walls diverge slightly in an axial direction as the radial distance from the shaft increases, so that a capillary sealing effect is established. This second seal 338 which is a diverging wall radial capillary seal also serves as a fluid reservoir.

A small oil fill hole 360 extends axially into this reservoir region 338. This oil fill hole 360 allows for both the initial filling of the reservoir and venting air as the internal oil volume changes. By keeping this oil fill hole small, and radially displaced from the shaft toward an outer end of the reservoir, filling the reservoir is relatively easy. Little of the vertical height of the motor needs to be devoted to the capillary seal and the reservoir. The volume of oil in the radial capillary seal 338 shown herein is on the order of 3–6 microliters. If a conventional capillary seal were used, the volume contained would be on the order of 1 microliter or less, with the conventional seal being the type described above which extends axially from the end of the fluid journal bearing. Thus, this concept can increase the reservoir volume by a factor of up to 3 or more over the prior art; thus an enlarged reservoir with effective fluid retention capacity against shock and a fluid maintenance capacity against evaporation is established.

Oil fill is accomplished by injecting oil through the oil fill hole 360. In a preferred embodiment, to keep the oil fill hole small, two holes 360 would be defined substantially axially through the wall 331. It is apparent that as the oil is maintained in the reservoir region 338, that the converging radial capillary seal draws oil from the reservoir region toward the journal gap 304. The axial capillary seal 330 described above, has a much smaller cross wise opening dimension than the radial seal 338. This makes the axial capillary seal 330 much stronger or stiffer than the radial seal 338 and insures that oil entering the seal region is maintained the radial seal volume, or in the journal bearing 318, and does not exit through the axial seal, 330.

One way of insuring the shield ID is as small as possible (creating a small annular gap) would be to install the shield prior to the final machining of the journal bore. The shield ID would then be machined at the same time as the journal bore. Another method would be to use a tapered shaft to center a shield with a loose fitting OD in the sleeve prior to attaching the shield (either through laser welding or adhesive bonding or other useful method). The end of the shaft which fit in the journal would not be tapered, but would be slightly undersize (0.002 to 0.005 mm). The section which fits in the shield ID would be tapered, and would be inserted into the shield until contact is made, taking up all the radial clearance.

Figure 7:
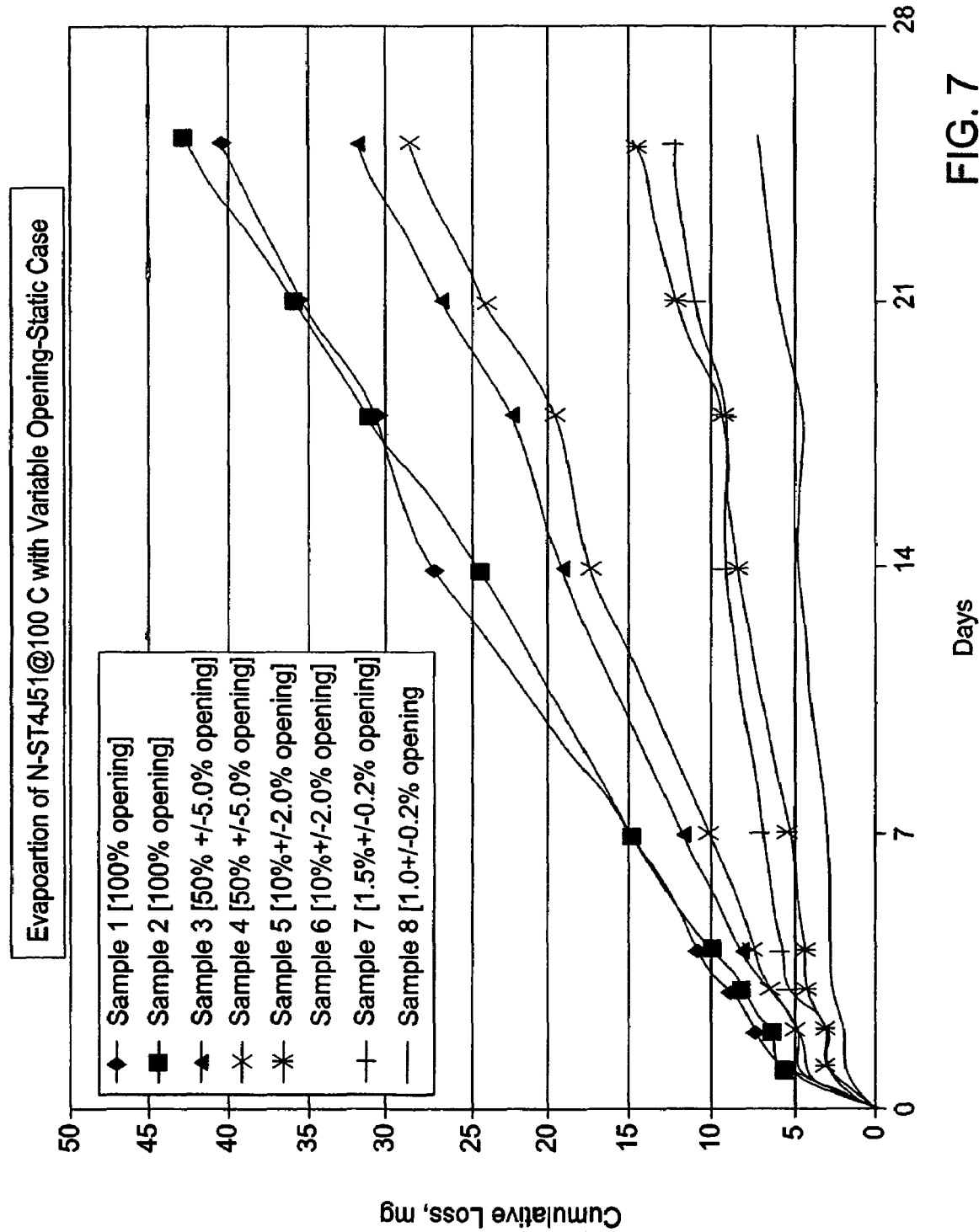
FIG. 7 illustrates diminished fluid loss achieved by this invention.

An important aspect of this invention is the reduction in oil evaporation which will occur due to the reduction of exposed oil surface area compared to a conventional capillary seal. Testing has shown that a quantity of oil contained within a vented volume has an evaporation rate roughly proportional to the area of the vent hole divided by the surface area of the oil at the oil-air interface within that volume. Testing has also shown that reducing the area of the vent hole in the oil enclosure to one tenth the area of the oil-air interface reduced the evaporation rate to a value of approximately one third the rate the oil-air surface would exhibit if it were exposed to ambient air. Thus, using a small vent hole and a small annulus in the axial seal, will result in an oil evaporation rate that is lower than that of prior art. This combined with a large reservoir, will either provide significantly longer life for the same type of oil, or enable the use of lower viscosity oil with an increased evaporation rate. The use of lower viscosity oil, if chosen properly, can provide a flatter slope of a viscosity vs temperature curve as shown in FIG. 7. Since bearings are designed for a minimum allowable stiffness at the maximum operating temperature, the increase in viscosity at lower temperatures decreases efficiency proportionally. A flatter oil, will exhibit a smaller reduction in efficiency as the temperature is reduced.

An alternative embodiment illustrating that the radial capillary seal of this invention can be used in combination bearings with an axial capillary seal is shown for example in FIG. 4. In this figure the shaft 400 is surrounded by a sleeve 402 which defines a bore 404 in which the shaft rotates. The shaft is supported for rotation by the sleeve 402. The sleeve further supports a seal plate 406 at an end thereof, so that a conical bearing 410 at an end of the shaft and known in this technology can be established to help support the rotating shaft. The conical bearing in this embodiment includes a cone 412 which is supported on or integrated with the shaft 400; fluid in the gap 414 supports the shaft for rotation.

In this embodiment, a circulation path 418 defined internally to the cone couples the bearing gap 414 and the gap 420 between the seal plate 406 and an axially facing surface 422 of the cone 410 so that fluid is maintained in the gap 414 between the cone 410 and the facing surface 424 of the sleeve 402. In order that the fluid is maintained in this gap region 414, a known axially oriented capillary seal 425 is provided between a surface 426 on the shaft 400 and a tapered surface 428 on the inner surface of the sleeve 402. As can be seen, this both prevents loss of fluid from the gap 414 and circulation path 418, and to the extent necessary establishes a reservoir region 430 for replenishing this fluid bearing.

A vent and fill hole 432 is also provided extending through the sleeve 402 so that the reservoir 430 and the fluid bearing gap 414 can be filled; and this vent 432 also maintains a separation bamer between the conical bearing 414 and the journal/conical bearing 440 which is integrated with the shaft 400 and supports the upper portion of the shaft 400 for rotation within the sleeve 402. In this conical bearing, the gap 442 between the shaft 400 and sleeve 402 is filled with fluid and maintained filled with fluid by the radial capillary seal and reservoir 444 which is structured and functions as described above with respect to FIG. 3. In addition to providing a seal and reservoir as described above, this reservoir is defined between an axially facing surface of the sleeve, and a shield 446 which is supported from the sleeve. A vent and fill hole 448 is provided as described above for filling the reservoir; and a plenum 450 keeps the fluid in the reservoir maintained adjacent to the axially outer end of the fluid gap 442. A miniscus 451, formed at a radially outer end of the fluid 444 keeps the fluid nearly adjacent the end of the bearing.

Figure 5:
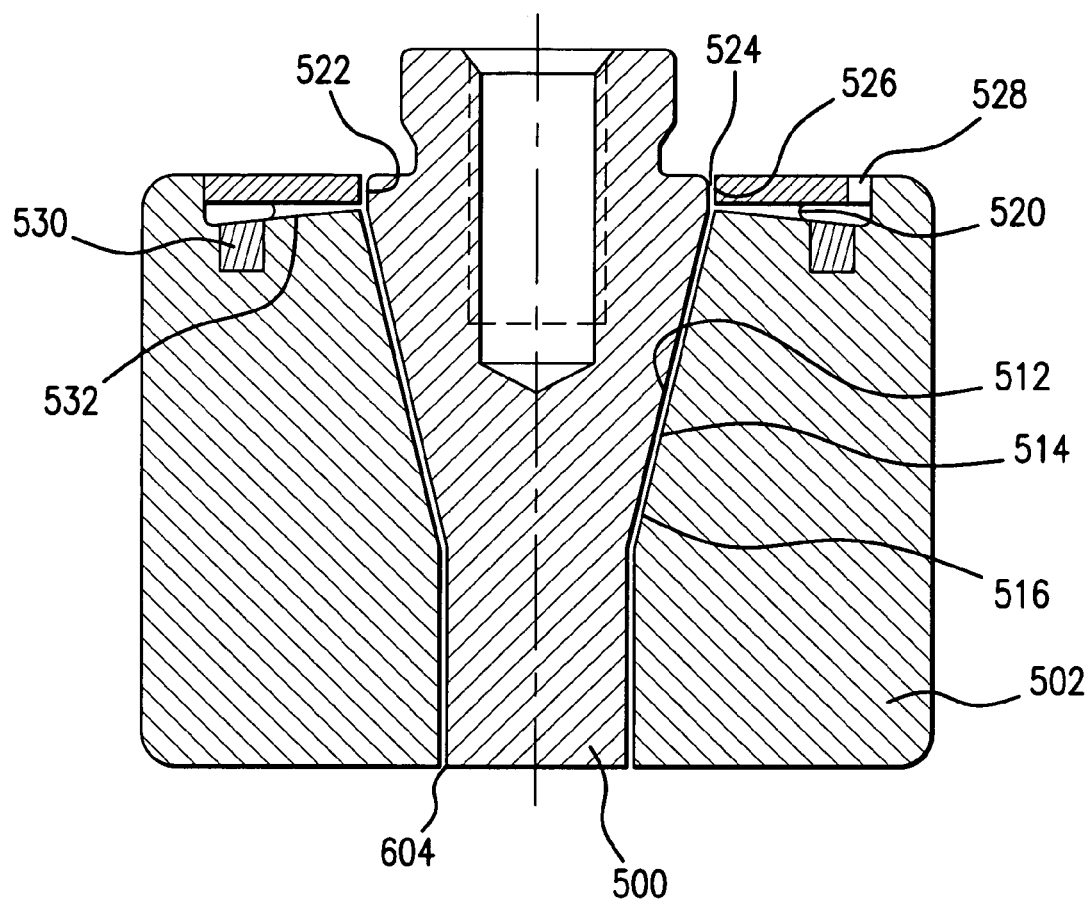
FIG. 5 is a vertical sectional view of a further alternative embodiment of the present invention incorporating a conical bearing, a radial capillary seal and optional fill reservoir.
Figure 6:
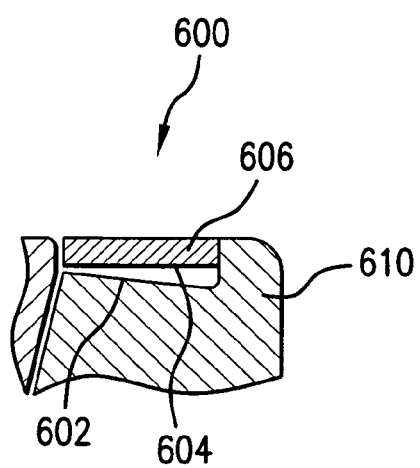
FIG. 6 is a partial sectional view of another embodiment of radial capillary seal.

A further alternative feature is shown in FIG. 5 which illustrates a rotating shaft 500 surrounded by a sleeve 502 which defines a bore 504 in which the shaft 500 rotates. As in the embodiment of FIG. 4, the upper end of the shaft 500 is supported for rotation by a conical bearing 510 wherein a gap 512 defined between a shaft surface 514 and sleeve surface 516 supports the relative rotation. The radial capillary seal 520 is provided adjacent an axially extending surface 522 of the shaft, with a small gap capillary seal 524 defined between the surface 522 and the facing surface 526 of shield region 528. The reservoir and capillary seal 520 comprises a fluid of low viscosity, which because of the design of the radial capillary seal can have a relatively high evaporation. But because of the very tight gap in 524, the evaporation is minimized as the opening is very small even though fluid exposed through the opening area is similar to conventional seal. This diminished rate of evaporation is clearly shown at FIG. 7 which illustrates the reduction in cumulative evaporation with the adoption of small gap capillary seal 524.

A fill reservoir 530 is defined in the generally axially facing surface 532 of the sleeve 502. This fill reservoir is an optional reservoir volume for initial filling, before the oil wicks into the motor, and provides a high volume reservoir for the rotating shaft motor of the previous figures. This reservoir region 530 may be filled with a highly absorbent material into which the oil may be poured, or may be left empty, depending on the requirements and orientation of the design.

Other features and advantages of the invention will be apparent to a person of skill in the art who studies the disclosure. For example, as shown in FIG. 5, the radial capillary seal 600 may comprise an axial wall 602 facing a diverging surface 604 of shield 606 supported from sleeve 610. Thus the scope of this invention, is to be limited only by the following claims.

What is claimed is:

1. A radial capillary seal for use in combination with a fluid dynamic bearing comprising a sleeve defining a bore in which a rotating shaft is supported for rotation relative to the sleeve, by a fluid dynamic bearing comprising fluid in a gap between an outer surface of the shaft and an inner surface of the sleeve, the radial capillary seal cooperating with at least one end of the fluid dynamic bearing comprising first and second diverging, generally radially extending walls, the diverging walls converging to a relatively small opening closely adjacent the outer surface of the shaft, wherein one of diverging walls is defined by a generally radially oriented wall of the sleeve, and the second wall is defined by a shield supported from the sleeve.

2. A radial capillary seal as claimed in claim 1, wherein the wall of the seal defined by said shield is axially oriented and perpendicular to the axis of the shaft, and the wall defined by the sleeve diverges axially from the wall defined by said shield.

3. A radial capillary seal as defined in claim 1, wherein the fluid dynamic bearing is a generally conical journal bearing defined along at least a portion of the shaft.

4. A radial capillary seal as claimed in claim 1, further comprising a second capillary seal defined between a radially inner surface of the shield and the outer surface of the shaft, the capillary seal thereby defining a narrow annulus adjacent the radial capillary seal to reduce fluid evaporation.

5. A radial capillary seal as claimed in claim 4, further comprising pumping grooves on one of the surfaces of the narrow annulus between the rotating shaft and the shield.

6. A radial capillary seal as claimed in claim 4, wherein the annulus is narrower than the relatively small opening of the axial gap.

7. A radial capillary seal as claimed in claim 6, further comprising a fill reservoir extending generally axially below the diverging wall of the sleeve and distal from the shaft for initial filling with fluid.

8. A radial capillary seal as claimed in claim 1, wherein the radial capillary seal defined by the diverging walls is sufficiently large to also serve as a reservoir for the fluid bearing supporting the shaft for rotation.

9. A radial capillary seal as claimed in claim 8, further comprising a fill hole defined axially through a shield leading to an air plenum and radially beyond the fluid filled portion of the reservoir and the meniscus at the radial end of the fluid in the reservoir.

10. A fluid dynamic bearing system comprising a sleeve, a shaft supported for rotation within the sleeve, the shaft including a thrust plate, at an end thereof, the sleeve supporting a counterplate adjacent the thrust plate, the shaft and thrust plate being supported for rotation relative to the sleeve by at least one thrust bearing, the shaft being further supported for rotation relative to the sleeve by a journal bearing defined by fluid in a gap between the shaft and the sleeve, and a radial capillary seal cooperating with at least one end of the fluid dynamic bearing comprising first and second diverging, generally radially extending walls, the diverging walls converging to a relatively small opening closely adjacent the outer surface of the shaft, wherein one of diverging walls is defined by a generally radially oriented wall of the sleeve, and the second wall is defined by a shield supported from the sleeve.

11. A fluid dynamic bearing system as claimed in claim 10, further comprising a second capillary seal defined between a radially inner surface of a shield and the outer surface of the shaft, the capillary seal thereby defining a narrow annulus adjacent the radial capillary seal to reduce fluid evaporation.

12. A fluid dynamic bearing system as claimed in claim 10, further comprising a fill hole defined axially through the shield leading to an air plenum and radially beyond the fluid filled portion of a reservoir and a meniscus at the radial end of the fluid in the reservoir.

13. A fluid dynamic bearing system as claimed in claim 12, wherein the radial capillary seal defined by the diverging walls is sufficiently large to also serve as the reservoir for the fluid bearing supporting the shaft for rotation.

* * * * *